June 13, 1933.  G. B. HAGEN  1,914,120

REGENERATIVELY COUPLED OSCILLATOR OR WAVE GENERATOR

Filed June 12, 1930

INVENTOR
GERHARD B. HAGEN
BY *H. G. Grover*
ATTORNEY

Patented June 13, 1933

1,914,120

UNITED STATES PATENT OFFICE

GERHARD B. HAGEN, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

REGENERATIVELY COUPLED OSCILLATOR OR WAVE-GENERATOR

Application filed June 12, 1930, Serial No. 460,592, and in Germany June 12, 1929.

This invention relates to an oscillation circuit and more particularly to a short wave oscillator circuit utilizing a crystal controlling device.

For the purposes of wave generation, especially the generation of short waves, it is frequently customary to have recourse to the scheme of providing a frequency changing stage between the control circuit and the consuming circuit. Schemes of this nature are particularly suited for quartz-controlled wave generators inasmuch as it is extremely difficult to make quartz crystals of a size so delicate that the useful or working frequency will be the same as the natural period of the crystal.

Broadly my invention consists in having a regeneratively coupled generator whose useful circuit oscillates at an even harmonic or overtone of the frequency of the control circuit. For the accomplishment thereof I employ two paralleled thermionic tubes the grids of which are controlled push-pull fashion by an oscillation circuit. A feature of my invention is that the tubes are operated with such a biasing potential that they will act as rectifiers. The anodes of the tubes are associated with the grids thereof by means of a feed-back coil, the output current being fed from the middle of said coil through a transformer to the utilizing circuit.

Figure 1:
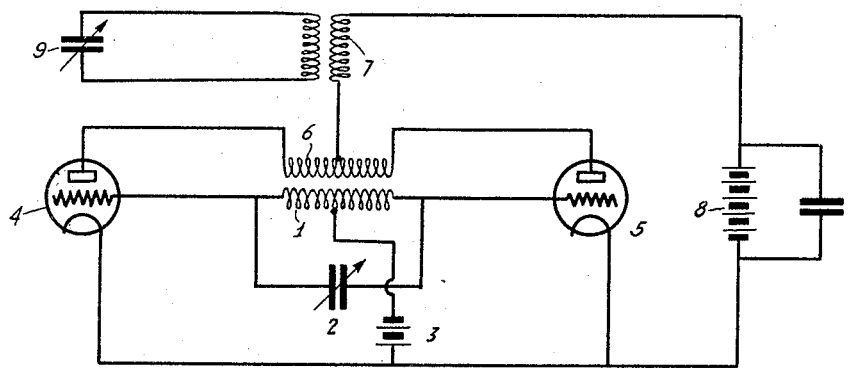
Figure 2:
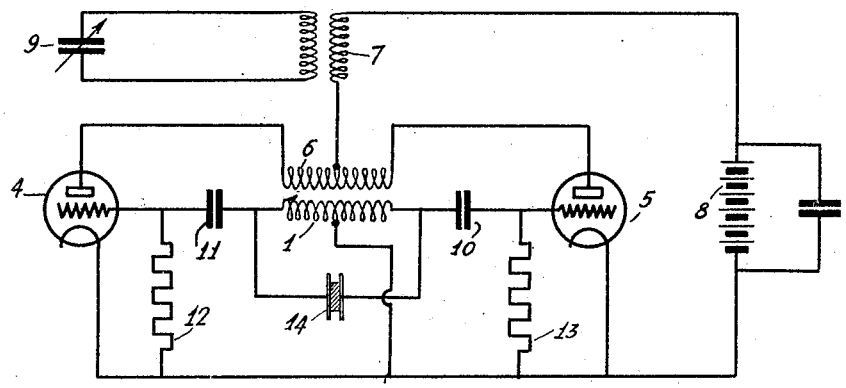

My invention will be more readily understood by reading the following detailed discussion together with the drawing in which, Figure 1 illustrates diagrammatically one embodiment of the invention; and, Figure 2 illustrates a modification thereof utilizing a grid amplification scheme.

In Figure 1, the controlling oscillation circuit comprises the coil 1 and the condenser 2. A biasing potential battery 3 interposed between the middle of the coil 1 and the filaments of the tubes 4 and 5 imparts the requisite biasing potential to the grids in order to insure rectifier action thereof. The differential transformer 6 serves for regeneration. In the coil 7 flows a direct current pulsating at a frequency twice that of the control oscillation. The plate potential is supplied from the battery 8. With coil 7 is coupled an oscillation circuit 9 wherein the higher harmonics of even order of the control frequency predominate.

In the modification shown in Figure 2, the thermionic tubes 4 and 5 are connected to result in grid rectification rather than plate rectification (audion connection), because this insures higher amplification. The grids of the two tubes are blocked by condensers 10 and 11, and are further provided with leak resistances 12 and 13. By choosing suitable dimensions for these circuit elements it is possible to make conditions so that the arising of the second or a higher even harmonic will be favored. The controlling oscillation circuit in this case consists of a quartz resonator circuit having therein a crystal device 14.

While I have indicated and described my invention as applied by only two typical examples it will be apparent to one skilled in the art that my invention is by no means limited to the particular organizations shown and described, but that many modifications in the circuit arrangements as well as in the apparatus employed, may be made without departing from the scope of my invention as set forth in the appended claim.

I claim:

A thermionic frequency generator comprising a pair of thermionic tubes having input and output electrodes, an inductance connected between the control electrodes of said tubes, a direct connection between the midpoint of said inductance and the filament of each of said tubes, a piezo-electric crystal connected in parallel with said inductance, a resistance connected in parallel with the input impedance of each of said tubes, an inductance comprising a differential transformer connected between the output electrodes of said tube, said last named inductance being coupled to said first named inductance for regeneration, another inductance connecting the midpoint of said output inductance to the filaments of each of said tubes, a load circuit coupled with said last named inductance, and means for tuning said load circuit to a harmonic of the normal frequency of said input circuit.

GERHARD B. HAGEN.